Patented Feb. 7, 1928.

1,658,334

UNITED STATES PATENT OFFICE.

TORSTEN ANDREAS FRITHIOFSSON HOLMGREN, OF STOCKHOLM, SWEDEN.

RESISTANCE MATERIAL.

No Drawing. Application filed January 14, 1925, Serial No. 2,444, and in Sweden January 22, 1924.

The present invention relates to resistance material, electrically conductive in a cold state, and usable at a high temperature.

I have previously proposed the production of a resistance material, conductive in a cold state, and usable at high temperatures, consisting essentially of an intimate mixture of finely crushed silicon carbide and a refractory cementing medium, burnt until the cement has more or less sintered.

The inventor's subsequent researches in this sphere have, however, made it clear that it is not the sintering that causes the change in electric conductivity, inasmuch as the conductivity does not ensue if the burning is made in an oxidizing atmosphere. The said change seems rather to be due to a chemical reaction, for which the conditions are, partly the presence of finely crushed silicon carbide or titanium carbide and magnesium oxide or calcium oxide or another oxide of the same group, partly that the burning is carried out at a temperature of up to about 1200 to 1800° C., in reducing atmosphere. It has not yet been made clear what chemical reaction takes place, or what new compound (or compounds) is formed, but is has been ascertained that the process is attended by increase in the weight of the material, and that the new compound or compounds formed are more easily burnt than silicon carbide.

Seeing that magnesium oxide with e. g. 5% admixture of aluminum oxide does not sinter till 1800°, whereas the electric conductivity is produced in a material made of silicon carbide and magnesium oxide on its being burnt in a so-called feldspar oven, used in pottery for glazing at a temperature of less than 1380°, it is obvious that the burning need not be carried on up to the point, when the vitrifying sets in. In all probability it is carbon monoxide that is absorbed and combines both with the oxide present and with the carbide.

Increases in weight of 3-10% under different conditions have been noted after the burning, when CaO (e. g. in cement) or MgO are ingredients of the cementing or binding medium.

In mixtures of 65-75% SiC with MgO even an increase in weight amounting to 25% has taken place. In some case an increase in the volume also takes place which may amount to 100%.

The characteristic feature of the present invention is that, with a view to the production of a resistance material, electrically conductive in a cold state and capable of withstanding a very high temperature without alteration, silicon carbide or other similar carbide is finely crushed and thoroughly mixed with a refractory cementing medium, consisting wholly or partly of magnesium oxide or calcium oxide or oxide of another metal belonging to the same group, whereupon the mixture is heated to 1200° or more in an atmosphere containing carbon monoxide.

Obviously a mixture produced in the manner above indicated may serve as a cementing medium in silicon carbide bricks or otherwise shaped bodies of crushed or granulated silicon carbide or other similar carbide conductive in a cold state.

The mixed mass is formed into suitably shaped pieces, which in certain cases may conveniently be manufactured by pressing at high pressure.

The mixture itself can naturally also in its turn be mixed with refractory material, non-conductive in a cold state such as magnesite or alundum, if desired in the form of grains of greater size, whereby, for example, magnesite bricks (or other suitably shaped bodies) can be obtained, which, owing to the admixture of the cementing medium, after burning in a reducing atmosphere, will be electrically conductive in a cold condition.

Further, in addition to the finely crushed carbide, also a metal difficult of fusion, or graphite, may naturally be admixed in order to secure greater conductivity.

Obviously, it is also possible to fill the pores of a carbide stone made of carbide and the cementing medium produced in the above stated manner with a precipitated metal or metals, suitable for changing the electric resistance and the temperature-coefficient, as compared with stones made by the burning, in the manner stated of carbide and refractory cementing medium solely.

It is of course also possible with a view to obtaining different conductivities (and thus to obtain different temperatures) in different parts on the same body, to use different compositions of the mixture in different parts of the said body or piece, either in such a way, that the proportions between silicon carbide and e. g. magnesium carbide in the finely crushed material are different in different parts of the piece or the body produced, whereby the specific resistances will be different in said different parts, or in such a way, that in the finely crushed mixture is used also a refractory oxide of another group of metals, e. g. silicic acid (silica) or alundum, whereby partly the specific resistances, partly its temperature coefficient will be different, finally in such a way, that the proportions between the finely crushed cementing medium and the rest of the material are varied.

A material produced in the manner above stated will, as above indicated, not remain constant at a high temperature in an oxidizing atmosphere. It is therefore advisable for use under such conditions to coat its surface with a suitable glaze, which is best effected after the combustible substance on the surface has been burnt away. What then remains on the surface is chiefly a mixture of silicic acid and magnesium oxide, or other oxide, which with a suitable composition and temperature will spontaneously be converted into a thick glaze. Thus under favorable conditions the material glazes itself in an oxidizing atmosphere. Where this is not the case, it is possible to render the material constant by coating the bodies or pieces formed from it with a special glaze.

The material may also first be burnt in an oxidizing atmosphere for the purpose to increase its mechanical strength, before the reaction above referred to, which causes an increase in weight, begins. This may be advantageous, as otherwise the chemical reaction is connected with an increase in volume.

Having thus described my invention, I declare, that what I claim is:

1. An electric resistance comprising an intimate mixture of finely crushed conductive carbide and a refractory binding medium consisting at least partly of an oxide of a metal of the even series of group 2 of the periodic system, said mixture having been fired at a temperature of at least 1200° C. in an atmosphere containing carbon monoxide.

2. An electric resistance comprising an intimate mixture of finely crushed silicon carbide and a refractory binding medium consisting at least partly of an oxide of a metal of the even series of group 2 of the periodic system, said mixture having been fired at a temperature of at least 1200° C. in an atmosphere containing carbon monoxide.

3. An electric resistance in accordance with claim 1 characterized by the presence of at least one other conductive material having a high fusing point or smelting temperature.

4. An electric resistance in accordance with claim 1 characterized in that the proportions between the mixed substances varies in different parts of the resistance for the purpose described.

5. An electric resistance body some parts of which comprise an intimate mixture of finely crushed conductive carbide and a refractory binding medium consisting at least partly of an oxide of a metal of the even series of group 2 of the periodic system, said mixture having been fired at a temperature of at least 1200° C. in an atmosphere containing carbon monoxide, and other parts of said body comprising a mixture having a different composition from that of the first named mixture.

6. An electric resistance body in which there is utilized an intimate mixture of finely crushed conductive carbide and a refractory binding medium consisting at least partly of an oxide of a metal of the even series of group 2 of the periodic system, said mixture having been fired at a temperature of at least 1200° C. in an atmosphere containing carbon monoxide, and at least one metal precipitated in the pores of the resistance body.

7. An electric resistance body in which there is utilized an intimate mixture of finely crushed conductive carbide and a refractory binding medium consisting at least partly of an oxide of a metal of the even series of group 2 of the periodic system, said mixture having been fired at a temperature of at least 1200° C. in an atmosphere containing carbon monoxide, and a glazed coating on the resistance body for the purpose described.

8. A process of manufacturing resistance material which comprises mixing finely crushed conductive carbide with an oxide of a metal of the even series of group 2 of the periodic system, and firing the mixture at not less than 1200° C. in an atmosphere containing carbon monoxide.

9. A process of making resistance material which comprises mixing finely crushed conductive carbide with an oxide of a metal of the even series of group 2 of the periodic system, forming the mixture into a shaped body, firing the body in a non-reducing atmosphere to increase its mechanical strength to thereby prevent substantial increase in volume during the subsequent firing and thereafter burning the body in a carbon monoxide atmosphere.

In witness whereof I have hereunto set my hand.

TORSTEN ANDREAS FRITHIOFSSON HOLMGREN.